J. N. BURRIS, DEC'D.

H. E. VOSS, ADMINISTRATOR.

NONSKID ATTACHMENT FOR VEHICLE TIRES.

APPLICATION FILED NOV. 30, 1920.

Reissued July 25, 1922. 15,418.

Inventor

James N. Burris

By Watson E. Coleman

Attorney

UNITED STATES PATENT OFFICE.

JAMES N. BURRIS, DECEASED, BY HENRY E. VOSS, ADMINISTRATOR, OF DAVENPORT, IOWA.

NONSKID ATTACHMENT FOR VEHICLE TIRES.

15,418. Specification of Reissued Letters Patent. Reissued July 25, 1922.

Original No. 1,298,001, dated March 25, 1919, Serial No. 163,290, filed April 19, 1917. Application for reissue filed November 30, 1920. Serial No. 427,412.

*To all whom it may concern:*

Be it known that JAMES N. BURRIS, late a citizen of the United States, deceased, did invent certain new and useful Improvements in Nonskid Attachments for Vehicle Tires, of which the following is a specification, reference being had to the accompanying drawings.

This invention relates to a non-skid attachment for automobile tires, and has for its principal object to provide a simple, easily applied device that forms one of a group of devices to be placed about the tire of an automobile wheel to prevent the machine from skidding, and may be quickly and easily put on at any time and in any place without the exertion of raising the car from the ground, necessary at the present time to apply the well-known chain attachments and others which are in common use at the present time.

Another object of the invention is to provide a simple attachment which will be strong and durable and which when injured or damaged may be readily and quickly removed so that a new one may be substituted.

Figure 1:
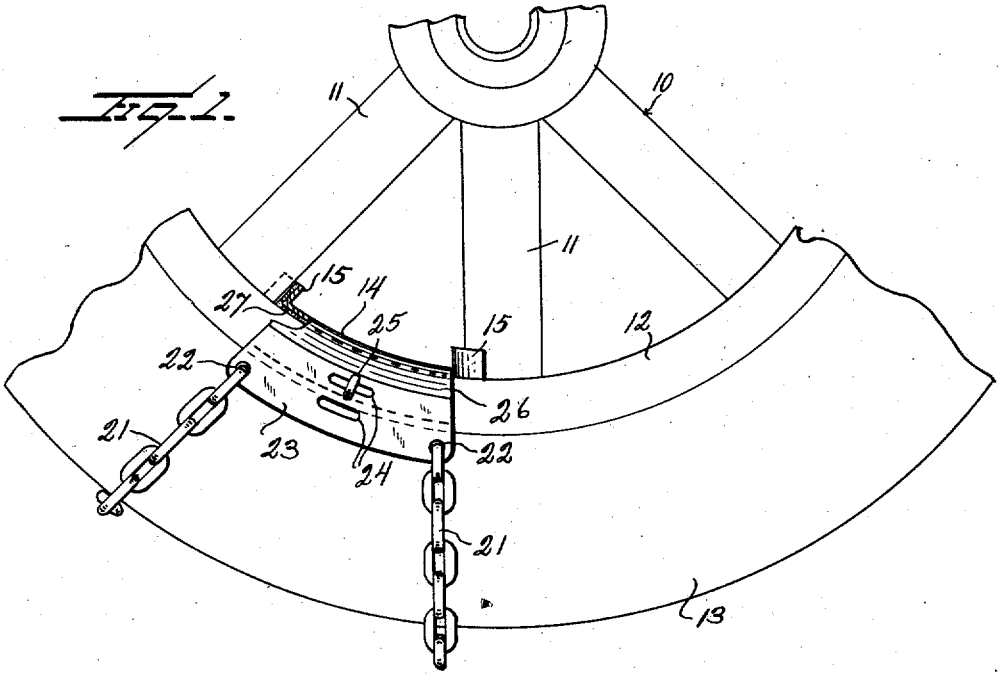
Figure 2:
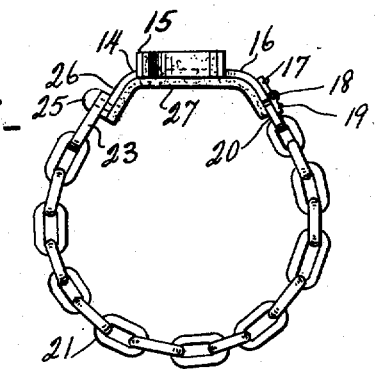

With the above as the principal objects in view, the invention consists of the novel construction, combination, and arrangement of parts hereinafter described, pointed out in the appended claims and illustrated in the accompanying drawings, in which:

Figure 1 is a side elevation of a portion of an automobile wheel with one of the nonslip devices constructed in accordance with an embodiment of my invention in position thereon, and Figure 2 is a similar view of the device as viewed from the right of Figure 1.

In the drawings, 10 indicates an automobile wheel of which 11 are the spokes, 12 the rim and 13 the tire which may be pneumatic or any other tire usually applied to an automobile wheel.

The saddle 14 is of arcuate shape both longitudinally and transversely and of a length to fit easily about the rim 12 of the wheel between two of the spokes as shown. On each end of the saddle 14 is a short upstanding flange 15 arcuately formed to provide an opening to partially receive, when the device is applied, the adjacent spoke 11 where it connects with the rim 12. The length of the saddle is sufficiently shorter than the distance between two adjacent spokes of the wheel to permit the saddle to be thrust into position between the spokes for engaging the rim of the wheel. The side 16 of the saddle 14 that curves over the inner side of the rim 12 has riveted or otherwise secured thereto one leaf 17 of a hinge 18, the other leaf 19 being similarly secured to a narrow plate 20 of a length equal to the length of the saddle 14. The plate 20 is provided with a perforation at each end and a pair of short chains 21 are attached to the plate 20, the end link in each chain being received in one of the perforations as shown. These two chains extend transversely around the tire and are connected at their other ends by the terminal links thereof engaging perforations 22 in the ends of an arcuately curved plate or bar 23 in the center of which are two longitudinal slots 24, either of which may be passed over a T-headed key 25 rotatably mounted near the lower edge of the outer side 26 of the saddle 14 and in the center thereof. Preferably the inner surface of the saddle 14 is lined with felt, rubber, or other suitable material 27 to prevent marring the surface of the rim 12, this lining extending upwardly into the concave portions of the flanges 15 to cushion the surface of said flanges and to yield and permit the introduction of the saddle between the spokes.

In practice, as many of the devices as needed may be applied to the wheel before starting on a journey, but if they have not been so applied and their need becomes imperative at any time during the journey, it is only necessary to place them one at a time on the wheel by separating the plate or bar 23 from the saddle 14 and after placing the saddle between the two spokes and against the rim, the chains are brought around the exterior of the tire and the plate or bar 23 placed against the saddle 14, one or the other of the openings 24 being slipped over the key 25 and the latter turned at a right angle to the opening to hold the plate or bar 23 in place. It is to be noted that the proper opening will be determined by the diameter of the tire and because of this difference in diameter, a plurality of openings are employed. The chains encircling the tire hold the saddle 14 against the rim and the arcuate flanges 15 are sufficiently close to the spokes to prevent rattling from longitudinal movement of the saddle on the tire. The saddles 14, it is readily understood, can be applied to the wheel at those portions that are free of the ground, and if necessary, they may be applied to the portions of the wheel on the ground after each wheel has made a partial revolution so that it is very evident that the attachment may be placed in position without the trouble of raising the wheel from the ground by means of a jack before the attachment can be placed in position. It is also evident that should any one of the chains break, or the saddle become injured in any way, it may be quickly removed when it is not in contact with the ground and a new device substituted in place.

What I claim is:

1. A non-skid attachment for automobile wheels comprising a saddle to snugly embrace the rim of a wheel, an inwardly curved radially extending flange on each end of said saddle to partly encircle the adjacent spoke of the wheel, said flanges preventing transverse movement and undue longitudinal movement of the saddle, the length of the saddle being sufficiently shorter than the distance between two adjacent spokes to permit the saddle to be thrust into position between the spokes for engaging the rim of the wheel, a pair of chains adapted to pass transversely across the tire, each chain being hingedly attached at one end to one side of the saddle, and means joining the other ends of the chains for releasably connecting them to the opposite side of the saddle.

2. A non-skid device embodying a saddle to engage a wheel felly, an attaching member, one side portion of the saddle being provided with an outstanding rotatable part, said part having a cross head, the attaching member having an opening through which said part extends when the cross head is in one position, said cross head when in a second position coacting with the attaching member for detachably holding the same to the saddle, and anti-slipping means connected to said attaching member and to the saddle.

3. An anti-skidding device comprising a body adapted to engage the felly of a wheel structure inwardly of the tire, flexible members engaged with one side portion of the body, and a member adapted for detachable engagement with the opposite side portion of the body and to which the flexible members are also connected, said flexible members, when the second named member is attached to the body, extending across the tread of the tire of a wheel structure, the second named member and the body being provided with coacting means to detachably secure the second named member to the body in a direction transversely of said second named member.

4. A non-skid device embodying a saddle to fit a wheel felly, an attaching member, one side portion of the saddle being provided with an outstanding part, the attaching member being provided with a slot through which said part extends, means carried by said part for retaining the attaching member to the saddle, and anti-slipping means connected to said attaching member and the side portion of the saddle remote from the outstanding part.

In testimony whereof I hereunto affix my signature.

HENRY E. VOSS,
*Administrator of the estate of James N. Burris, deceased.*